UNITED STATES PATENT OFFICE.

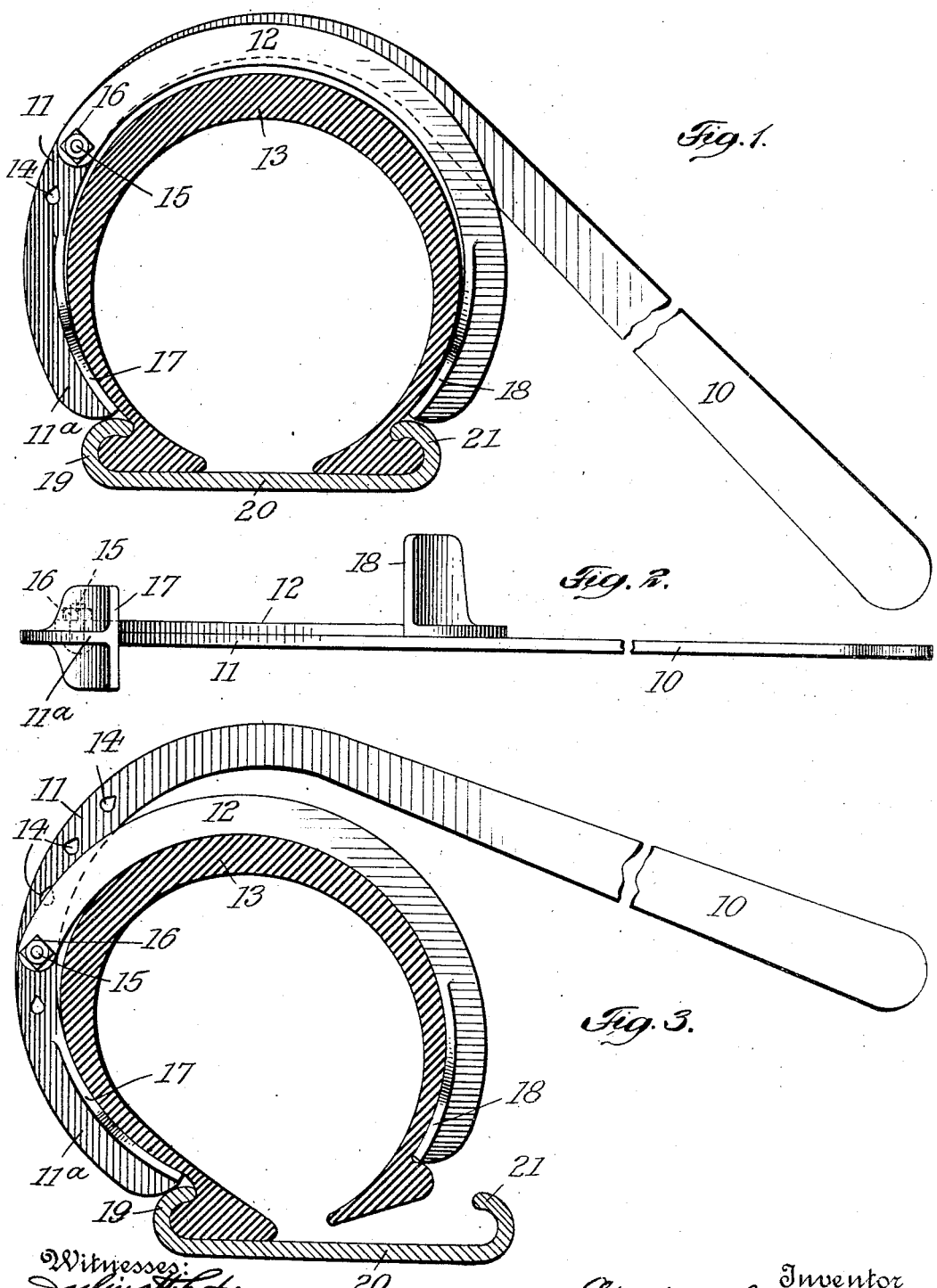

GUSTAV SCHAEFER, OF NEW YORK, N. Y.

TIRE-TOOL.

1,061,015.

Specification of Letters Patent.

Patented May 6, 1913.

Application filed December 26, 1911. Serial No. 667,626.

*To all whom it may concern:*

Be it known that I, GUSTAV SCHAEFER, a citizen of the United States, residing at New York city, county and State of New York, have invented a new and Improved Tire-Tool, of which the following is a specification.

This invention relates to a tool of novel construction for dislodging pneumatic tires from wheel rims, so that the replacement of a worn or punctured tire may be quickly effected without danger of damaging the tire.

In the accompanying drawing: Figure 1 is a side view of a tool embodying my invention, showing it in use with the tire and wheel rim in section; Fig. 2 a bottom view of the tool, and Fig. 3 a view similar to Fig. 1, showing the tire partly dislodged.

The tool comprises a flat bar 10 terminating in a handle and having one end curved in the plane of the bar to approximate the circumference of the tire. This curved end thus forms a relatively fixed arm 11 which is adapted to embrace approximately half of the tire 13 to be removed. To arm 11, there is pivoted at or near the middle of its curve, a second flat arm 12 constituting a relatively movable jaw and curved also to approximate the circumference of the tire, about one half of which it is adapted to embrace.

It is preferred to render the pivotal connection between arms 11 and 12 adjustable so as to set the device to tires of different diameters. For this purpose, arm 11 is provided with a plurality of apertures 14, through either one of which the pivot pin 15 that passes also through a single aperture of arm 12 may be inserted. A nut 16 carried by the threaded end of pin 15 locks the latter in place after the desired adjustment has been effected. Arm 11 is provided at its free end with a laterally extending concave flange 17, the inner working face of which is flush with the inner working edge of the arm to provide a wide jaw for engaging the tire on one side. To this effect the arm and jaw are struck from a common center with a like radius. Jaw 17 extends laterally from both sides of the arm, the lower end 11$^a$ of the latter forming a reinforcing rib centered on the outer convex side of the jaw (Fig. 2), so that the device is here T-shaped in cross section. Movable arm 12 is likewise provided at its free end with a laterally extending concave flange 18, that is flush with the inner curved edge of said arm, to afford an opposing jaw face. Jaw 18 however extends only from one side of arm 12, *i. e.* from that side opposite to the one facing handle 10, so that the device is here L-shaped in cross section. This construction is for the purpose of preventing the jaw on opening, from striking the handle, and from thus interfering with the free play of arm 12.

In use arm 11 is rested upon the outer flange 19 of wheel rim 20 while arm 12 is manually drawn toward and over the inner flange 21 (Fig. 1). In this way the arms will jointly encompass the tire, so that the jaws will obtain a firm grip thereon. By now swinging bar 10 upward, jaw 18 will pry the tire from underneath inner flange 21 (Fig. 3), so that it may subsequently be readily drawn from under outer flange 19.

It will be seen that the tool will insure a firm grip on the tire and that owing to the extensive bearing surfaces provided by the jaws, the tire is not liable to be cut or otherwise injured, even when subjected to considerable strain during the dislodging operation. At the same time the jaws while adapted to closely grasp the tire, will in no wise prevent a free play of the arms during the opening or closing movement of the tool.

I claim: -

A tire tool comprising a flat bar having one end curved in the plane of the bar to approximate the circumference of a tire to embrace approximately one half thereof, and having at its free end a lateral flange flush with the inner edge of the curved portion to provide a wide jaw to engage the tire on one side, a flat arm pivoted to the said bar at approximately the middle of the curve and curved also to approximate the circumference of the tire and embracing approximately the other half thereof and also having at its free end a flange flush with the inner curved edge to afford an opposing jaw face.

GUSTAV SCHAEFER.

Witnesses:
FRANK V. BRIESEN,
KATHERYNE KOCH.